United States Patent [19]
Goskowicz et al.

[11] Patent Number: 5,814,986
[45] Date of Patent: Sep. 29, 1998

[54] COIL RETAINER/POSITIONER FOR INDUCTIVE PROXIMITY SENSOR

[75] Inventors: Mark A. Goskowicz, Milwaukee, Wis.; Timothy A. Christensen, Camano Island, Wash.; James H. Sager, Bayside, Wis.

[73] Assignee: Eaton Corporation, Cleveland, Ohio

[21] Appl. No.: 819,276

[22] Filed: Mar. 18, 1997

[51] Int. Cl.[6] .............................. G01B 7/14; G01R 33/00; H01F 27/30; H01F 41/00
[52] U.S. Cl. ................. 324/207.26; 29/606; 324/207.16; 324/234; 336/92; 336/197; 336/229
[58] Field of Search ..................... 324/173, 174, 324/207.15, 207.16, 207.17, 207.25, 207.26, 229–231, 234, 236–240, 258; 29/595, 606; 336/10, 20, 65, 83, 92, 130, 185, 196–199, 206, 208, 229; 307/116, 117

[56] References Cited

U.S. PATENT DOCUMENTS

| | | | |
|---|---|---|---|
| 3,743,853 | 7/1973 | Dittman et al. | 324/236 X |
| 3,996,510 | 12/1976 | Guichard | 324/236 X |
| 4,419,646 | 12/1983 | Hermle | 324/207.26 X |
| 4,455,528 | 6/1984 | Walker | 324/236 X |
| 5,278,498 | 1/1994 | Vernon et al. | 324/234 |

*Primary Examiner*—Gerard R. Strecker
*Attorney, Agent, or Firm*—Larry G. Vande Zande

[57] ABSTRACT

A coil is inherently aligned with the open face of a cup core and prevented from recessing into the core upon assembly of the coil and core into a housing by placing a resilient foam washer within the core under the coil to cause the coil to normally extend beyond the open face of the core and subsequently securing the subassembled core and coil pressed against a common internal surface of the housing, compressing the foam washer. Internal tabs on the foam washer are compressed between the center boss of the cup core and the internal surfaces of the coil opening to retain the coil assembled to the core as a separate subassembly.

19 Claims, 2 Drawing Sheets

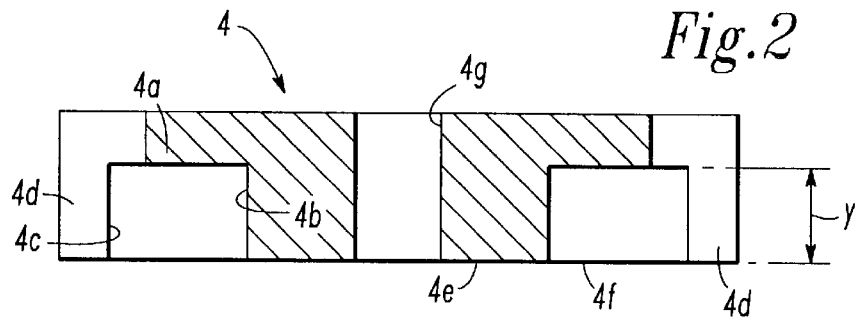
*Fig.2*
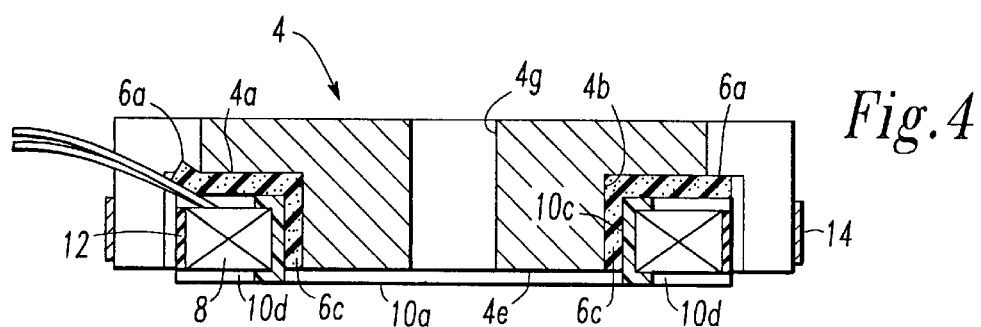
*Fig.3*
*Fig.4*
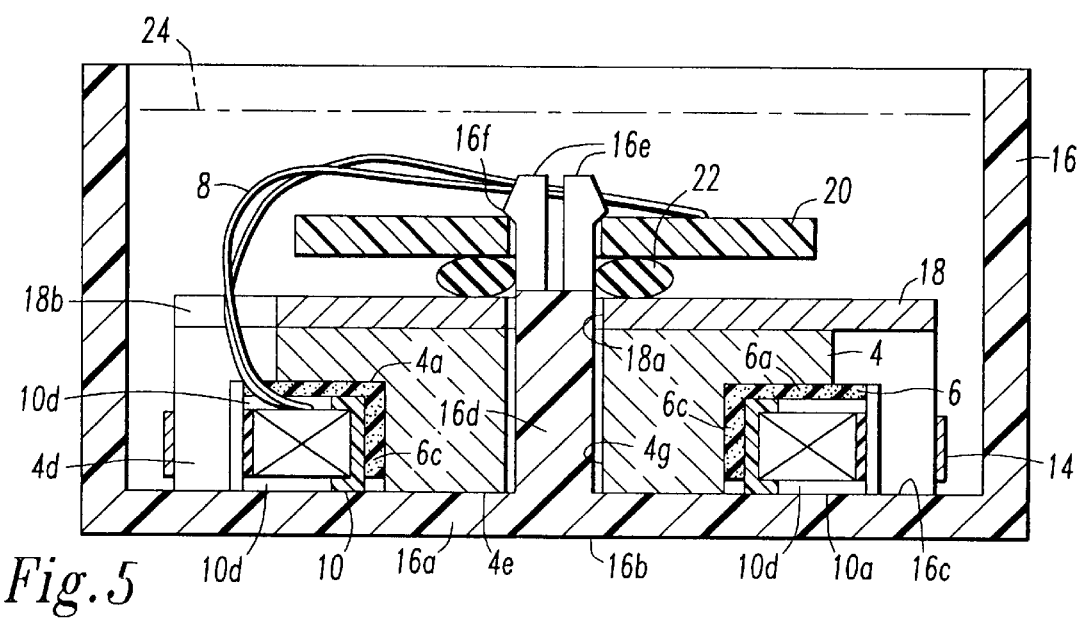
*Fig.5*

COIL RETAINER/POSITIONER FOR INDUCTIVE PROXIMITY SENSOR

BACKGROUND OF THE INVENTION

This invention relates to inductive proximity sensors and particularly to a means for retaining the sensor coil within a ferrite cup core during assembly and predictably positioning the coil relative to the core in final assembly. The position of the coil relative to the open face of the cup core affects critical parameters of the sensor such as inductance and the Q factor. Normal manufacturing tolerances in the depth of commercial cup cores and in the height of bobbins for inductive coils causes a variance in the positioning of the coil with respect to the face of the cup core sufficient to cause a change of up to 25% in the inductance and Q factor. This random positioning of the sensor coil requires operating point adjustments after final assembly and may create temperature compensation problems in the final product.

A known and practical method of achieving uniform placement of the coil relative to the face of the cup core is to glue the coil into the core. This is a specific sub-assembly operation and is not desirable from that viewpoint alone. Glueing also creates another disadvantage in that the glue is thin and can expand over temperature increases. The core is sintered from ferrite pellets and has tiny voids created from pellet sintering. The glue seeps into these voids, expands over temperature increases, and causes hairline fractures in the core. A cracked core produces random operating characteristics and makes it more difficult to achieve longer operating ranges. Furthermore, glue is not uniformly or evenly applied to the core, causing the coil to assume an off-center position relative to the core.

SUMMARY OF THE INVENTION

This invention provides a means for effecting precise placement of a coil to a core of an inductive proximity sensor. The invention allows manufacturing tolerances to be relaxed and provides inductive proximity sensors which are uniform and repeatable in their performance. The invention further provides an assembly aid for the manufacture of inductive proximity sensors which permits the sensor coil and core to be readily assembled and handled without separating after subassembly. The invention provides a resilient elastomeric foam washer having radially inwardly extending tabs similar to an internal tooth lock washer disposed between a core and a coil. The coil may be free-standing, potted or wound on a bobbin. The core may be a cup or pot core with the outer ring face coplanar with the face of the center boss or stepped below the center boss face, or may be a T-core with no outer ring. The coil is pushed onto the core over the foam washer, deflecting the tabs alongside the center boss of the core to center the coil around the center boss and to frictionally hold the coil attached to the core. The body portion of the foam washer is disposed between the base of the core and the coil to bias the forward surface of the coil above the distal face of the center boss of the core. The core and coil subassembly is inserted within a housing for the inductive proximity sensor whereby the coil abuts an interior surface of the housing immediately opposite an exterior sensor face. Means are provided for attaching the core to the housing such that the distal face of the center boss of the core firmly abuts the same interior surface of the housing, compressing the foam washer and maintaining the coil in the same forward plane as the face of the core, preventing the coil from being recessed relative to the leading face of the core.

The invention, its features and advantages will become more readily apparent when reading the following description and claims in conjunction with the appended drawings.

BRIEF DESCRIPTION OF THE DRAWINGS

FIG. 2 is a cross sectional view of the core, inverted relative to the illustration in FIG. 1;

FIG. 3 is a cross sectional view of the coil, inverted relative to the illustration in FIG. 1;

FIG. 4 is a cross sectional view of the coil subassembled to the core using the retainer/positioner according to this invention; and FIG. 5 is a cross sectional view of the coil and core assembled within an inductive proximity sensor housing according to this invention.

DETAILED DESCRIPTION OF THE PREFERRED EMBODIMENT

Figure 1:
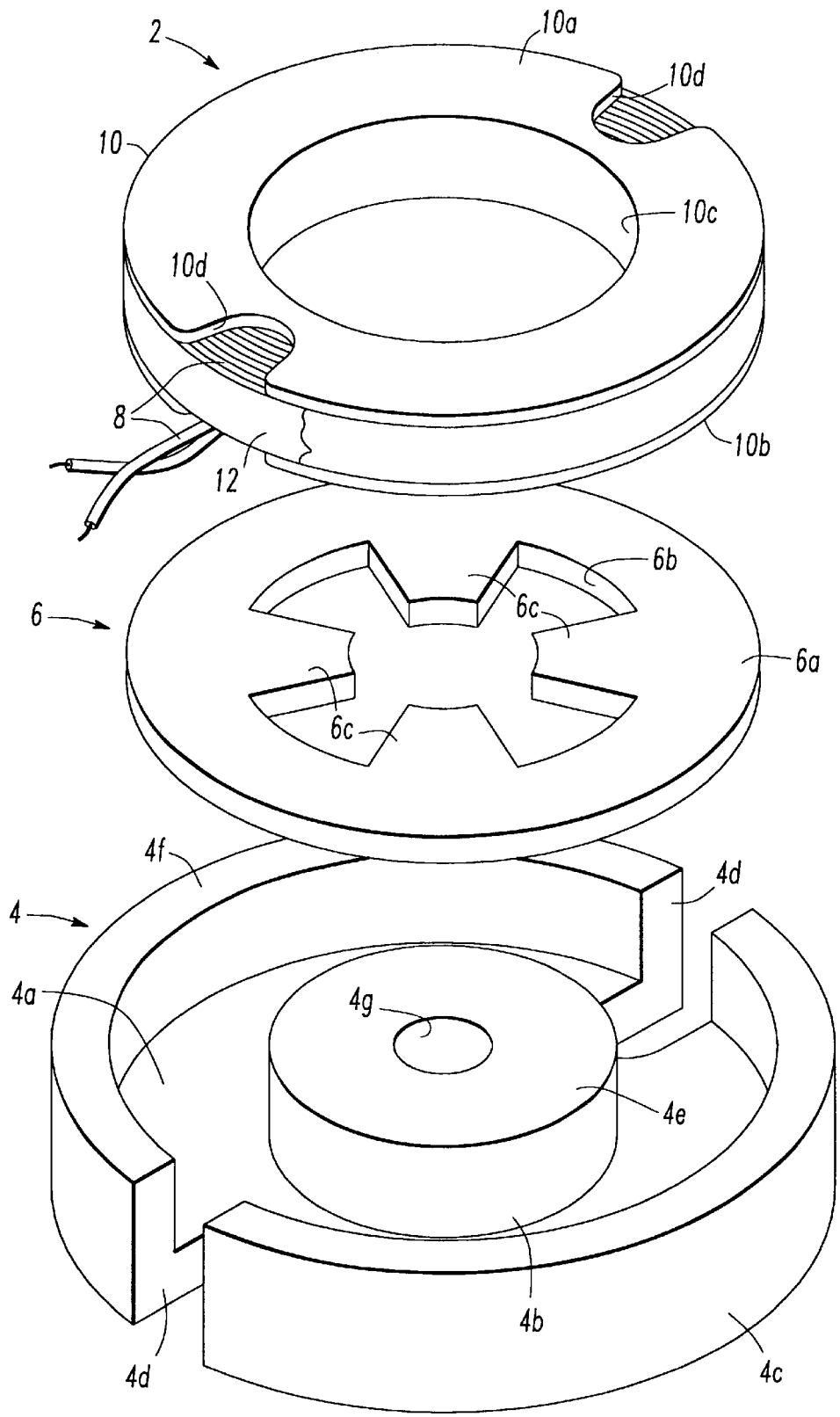
FIG. 1 is an exploded axonometric view of a coil, a core and a retainer/positioner for an inductive proximity sensor constructed in accordance with this invention.

This invention relates to the coil and core subassembly in an inductive proximity sensor. The drawings illustrate one preferred embodiment as applied to a "pancake" styled proximity sensor, but the invention applies equally well to other style sensors such as tubular, industrial limit switch, and the like. A coil 2 and a ferrite cup core 4 are shown in FIG. 1 with a retainer/positioner 6. Coil 2 may be a free-standing conductive coil, a potted coil or, as shown, a wire conductor 8 wound on a dielectric bobbin 10. The bobbin 10 comprises circular flanges 10a and 10b at opposite ends of a central hub through which an axial opening 10c extends. Pairs of diametrically opposed, axially aligned slots 10d are provided in flanges 10a and 10b. The ends of coil conductor 8 are brought out through one of the slots 10d. An insulating tape 12 is wound on the periphery of coil conductor 8 to prevent the conductor from unwinding although the tape may be omitted and the wire retained on the core by twisting outer loops together.

Ferrite cup core 4 is preferably a sintered member having a circular base 4a from which an axial cylindrical boss 4b and a concentric annular ring 4c project in a common direction. Diametrically opposed slots 4d are provided in ring 4c and extending into base 4a. Boss 4b has a generally planar distal face 4e which preferably is coplanar with a distal face 4f of ring 4c, although it is contemplated herein that face 4e could project further from base 4a than face 4f or that ring 4c could be omitted entirely. An axial opening 4g is commonly provided through boss 4a as a part of the sintering process to reduce the material wall thickness of boss 4b..

Retainer/positioner 6 comprises a resilient washer cut from an elastomeric foam material of the polyurethane family. The washer comprises a disk shaped main body 6a having a center opening 6b. A plurality of spaced tabs 6c are arranged on the periphery of opening 6b to project radially inwardly from the opening. Alternatively the opening 6b could be smaller and the tabs replaced by a plurality of slits. However, the spaced tabs provide for a more uniform, distribution of material in assembly of the coil to the core, and the opening 6b, being slightly larger than the diameter of boss 4b, permits visual concentric alignment of the washer 6 to the core 4 in the assembly process. Washer 6 is positioned on the cup core 4 with tabs 6c lying on the distal face 4e and the body 6a aligned over the recess formed between boss 4b and ring 4c. Coil 2 is centered over boss 4b and is pushed into the recess, driving the foam washer 6 to the base 4a and causing tabs 6c to deflect along the cylindrical surface of boss 4b, compressing the tabs between that surface and the surface of opening 10c in coil 2. The compressed tabs 6c function to center the coil 2 relative to boss 4b of the cup core, and to provide a frictional fit for the coil to the cup core capable of withstanding routine handling of the subassembly prior to final assembly in the sensor housing without separating. As may be seen in FIG. 4, the ends of tabs 6c do not project beyond the distal face 4e in the subassembly. It should also be noticed in FIG. 4 that the forward surface of coil 2 projects beyond distal face 4e in the subassembled state because the main body portion 6a of foam washer 6 is not compressed. The axial dimension X (FIG. 3) of coil 2 is less than the axial dimension Y (FIG. 2) of the recess in cup core 4 to permit coil 2 to move entirely within the recess. As a final step to the subassembly, one or more turns of a conductive shield such as an adhesive backed copper strip 14 is wrapped around the periphery of cup core 4 to shield magnetic fields to the side and rear such that the device will ignore metal materials in these regions to reduce installation clearances.

A non-magnetic housing 16 for the inductive proximity sensor is open to a back side thereof Housing 16 is oriented with the back side facing upwards in FIG. 5. A front wall 16a of housing 16 defines a generally planar sensor face 16b on an external surface and an also generally planar internal surface 16c on the opposite side of front wall 16a. A rearwardly projecting post 16d is provided on internal surface 16c to make use of the axial opening 4g in core 4 for assembling the coil/core subassembly to the housing 16.. The distal end of post 16d has a plurality of fingers 16e formed by crossed slots. The external surface of the fingers has an enlarged annular cam surface 16f to provide a snap fit with a retainer or keeper element as will be described hereinbelow.

The subassembled coil 2 and cup core 4 are assembled into housing 16 by orienting coil 2 toward internal surface 16c, aligning axial opening 4g of core 4 with post 16d, and pressing the subassembly over post 16. A circular plate magnetic flux guide 18 having an axial hole 18a and one peripheral slot 18b is disposed over post 16d against ferrite core 4. Slot 18b is aligned with the particular slot 10d in bobbin 10 that wire conductors 8 project through. It will be apparent from FIG. 4 that with the subassembly so positioned, the forward face of coil 2 will abut internal surface 16c, and distal face 4e of cup core 4 will be spaced away from surface 16c.

The assembly is completed by attaching a retainer or keeper to post 16d. In the preferred embodiment, the keeper is a printed circuit board 20 having a central hole that provides an interference snap fit with the distal end of post 16d, particularly with annular cam 16f. Alternatively, the keeper could be a washer or a non-printed circuit board and could be attached by a screw or snap fastener to a suitable hole in the end of post 16d. The snap fit cam means may alternatively be formed on the interior walls of the housing and the keeper made larger to fit closely to the walls to engage the cam means. One or more biasing elements such as O-ring 22 is disposed around post 16d on top of flux guide 18. Other biasing elements such as springs are also contemplated. Printed circuit board 20 is pressed over the end of post 16d, deflecting fingers 16e inwardly to permit the opening in the board to pass over the cam 16f. The pressure applied to printed circuit board 20 compresses the resilient biasing element 22 which in turn applies a force on cup core 4, forcing distal face 4e against internal surface 16c, compressing the main body portion 6a of foam washer 6. Thus coil 2 is aligned with the forward or distal face of cup core 4, i.e. not recessed within the core, for uniform and repeatable operation of each sensor so constructed without a need for calibration or other adjustment.

Wire conductors 8 may be soldered to terminal pads on the top of board 20, which may further have connection to a power cable (not shown) brought out of housing 16 through a suitable opening or connector. The housing is preferably filled with a hardenable epoxy to a level represented by dot-dash line 24 in FIG. 5 to secure all the components in place and provide a durable product. It is contemplated that snap-on cam structures could be formed on interior walls of the housing and the keeper made larger to engage such structures along its edges as an alternative to the center post construction. It is further contemplated that tabs 6c may project from the outer periphery of foam washer 6 when used with a cup core 4 having an outer annular ring 4c whereby the tabs are deflected and compressed between the inner surface of the ring and the outer periphery of the coil. Although the foregoing describes a preferred embodiment, it is to be understood that it is susceptible of various modifications and changes without departing from the scope of the appended claims.

We claim:

1. An inductive proximity sensor comprising;
   a non-magnetic housing having a generally planar internal surface;
   a magnetic core comprising a base and a cylindrical center boss projecting from said base;
   an electrical coil having an axial opening therethrough, an axial dimension of said coil being less than an axial dimension of said center boss from said base to a distal face of said boss;
   resilient means disposed between said base and said coil positioning said coil beyond said distal face of said boss;
   said core and said coil being disposed in said housing wherein said coil and said distal face of said boss are held firmly against said internal surface, compressing said resilient means.

2. The inductive proximity sensor defined in claim 1 wherein said resilient means comprises a foam disk having a center opening and radially directed members contiguous with said center opening, said members being compressively disposed between said axial opening of said coil and said cylindrical center boss of said core for frictionally attaching said coil to said core.

3. The inductive proximity sensor defined in claim 2 wherein said foam disk comprises an elastomeric material selected from the polyurethane group.

4. The inductive proximity sensor defined in claim 3 wherein said members comprise spaced tabs extending radially inward from said center opening.

5. The inductive proximity sensor defined in claim 4 wherein said center opening is a clearance opening for said cylindrical center boss.

6. The inductive proximity sensor defined in claim 5 wherein said core comprises an axial hole through said cylindrical center boss and said housing comprises a post projecting from said internal surface, said core being disposed over said post with said post extending through said axial hole, and means on said post securing said core to said housing.

7. The inductive proximity sensor defined in claim 6 wherein said means on said post comprises resilient snap-fit cam means.

8. An inductive proximity sensor comprising:

a non-magnetic housing providing an external sensor face and an internal surface opposite said sensor face;

a magnetic cup core comprising a circular base having an axial cylindrical boss and a concentric annular ring projecting unidirectionally from said base;

an electrical coil disposed in said cup core around said boss, an axial dimension of said coil being less than an axial dimension of said boss between said base and a distal face of said boss;

resilient means disposed between said base and said coil positioning said coil beyond said distal face of said boss;

said cup core and said coil being disposed in said housing wherein said coil engages said internal surface; and means in said housing for retaining said cup core distal face pressed firmly against said internal surface, said resilient means being compressed for holding said coil firmly against said internal surface.

9. The inductive proximity sensor defined in claim 8 wherein said resilient means comprises a disk fitting inside said annular ring and having a center opening providing clearance for said boss, said disk comprising a foam elastomeric material selected from the polyurethane group.

10. The inductive proximity sensor defined in claim 8 wherein said resilient means comprises a disk having a center opening providing clearance for said boss and a plurality of tabs projecting radially inwardly from said opening, said tabs being deflected along a cylindrical wall of said boss when said coil is disposed in said cup core, said tabs being compressed between said cylindrical wall and said coil for providing a friction fit for said coil to said cup core.

11. The inductive proximity sensor defined in claim 10 wherein said resilient disk comprises a polyurethane foam.

12. The inductive proximity sensor defined in claim 9 wherein said coil comprises a rigid dielectric body containing a wound wire coil.

13. The inductive proximity sensor defined in claim 9 wherein said coil comprises a molded dielectric bobbin having a conductive wire wound thereon.

14. The inductive proximity sensor defined in claim 13 wherein said bobbin comprises an axial hole therethrough, said housing comprises a post projecting from said internal surface through said hole, and said means in said housing for retaining said cup core distal face pressed firmly against said internal surface comprises resilient fingers on a distal end of said post.

15. The inductive proximity sensor defined in claim 14 wherein said means in said housing for retaining said cup core distal face pressed firmly against said internal surface comprises a keeper retained on said post by said resilient fingers, and biasing means disposed between said keeper and said bobbin biasing said coil against said internal surface.

16. The induction proximity sensor defined in claim 8 wherein said resilient means comprises a disk having a center clearance opening for said boss and a plurality of tabs projecting radially from said disk, said tabs being deflected along an axially directed wall of said cup core when said coil is disposed in said cup core, said tabs being compressed between said wall and said coil for providing a friction fit for said coil to said cup core.

17. A method of assembling an inductive proximity sensor coil to a cup core comprising the steps of:

placing a foam washer having radial inwardly projecting tabs on an inner diameter over a distal face of a center boss of said cup core such that said tabs overlie said face; and pressing a coil over said center boss and said foam washer, causing said tabs to be deflected between adjacent wall portions of said coil and said center boss in a compressed state for frictionally retaining said coil on said cup core.

18. A method of assembling the coil and cup core assembled as defined in claim 17 into an inductive proximity sensor housing wherein a body of said foam washer is disposed between said coil and said cup core biasing said coil to project beyond a distal face of said cup core comprising the steps of:

inserting said assembled coil and cup core into a housing whereby said projecting coil abuts an internal surface of said housing;

pressing said cup core into said housing to cause said distal face to engage said internal surface, thereby compressing said foam washer; and securing said cup core in said housing pressed against said internal surface.

19. A method of attaining alignment of an inductive proximity sensor coil with a distal face of a cup core containing said coil within a housing comprising the steps of:

biasing said coil to project beyond said distal face;

positioning said coil and said cup core distal face adjacent a common surface within said housing;

biasing said cup core toward said common surface to effect engagement of said distal face and said coil with said common surface.

* * * * *